United States Patent [19]

Richard

[11] Patent Number: 4,900,901
[45] Date of Patent: Feb. 13, 1990

[54] TAMPER PROOF ASSEMBLY

[76] Inventor: Iguy Richard, P.O. Box 1295, Miami, Fla. 33261

[21] Appl. No.: 363,688

[22] Filed: Jun. 9, 1989

[51] Int. Cl.⁴ .............................................. G01C 22/00
[52] U.S. Cl. ..................................... 235/95 R; 235/96
[58] Field of Search ................................ 235/95 R–97

[56] References Cited

U.S. PATENT DOCUMENTS

| | | | |
|---|---|---|---|
| 1,841,318 | 1/1932 | Earnest | 235/96 |
| 3,539,783 | 11/1970 | Bergsma al. | 235/96 |
| 3,667,671 | 6/1972 | Hachtel | 235/96 |
| 3,785,551 | 1/1974 | Regan | 235/95 R |
| 4,267,438 | 5/1981 | Regan | 235/96 |
| 4,284,882 | 8/1981 | Woodward | 235/96 |

Primary Examiner—B. R. Fuller
Attorney, Agent, or Firm—Malloy & Malloy

[57] ABSTRACT

An assembly to indicate and prevent unauthorized tampering and more specifically, detachment of the odometer cable from the transmission of an automobile, truck or like vehicle. The assembly includes a tamper indicator formed at least partially from a frangible material which, upon the application of force thereto, such as when attempts are made to disconnect the odometer cable from the transmission, the tamper indicator will be severed and indicate exposure or disconnection of the cable.

16 Claims, 2 Drawing Sheets

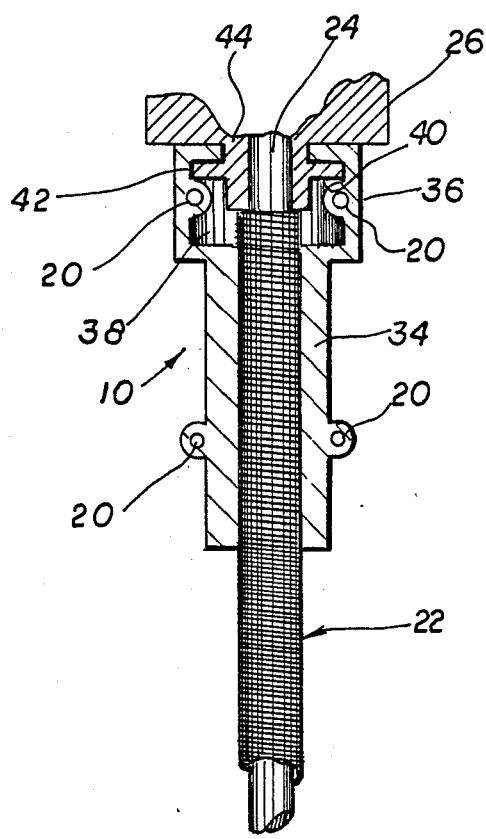
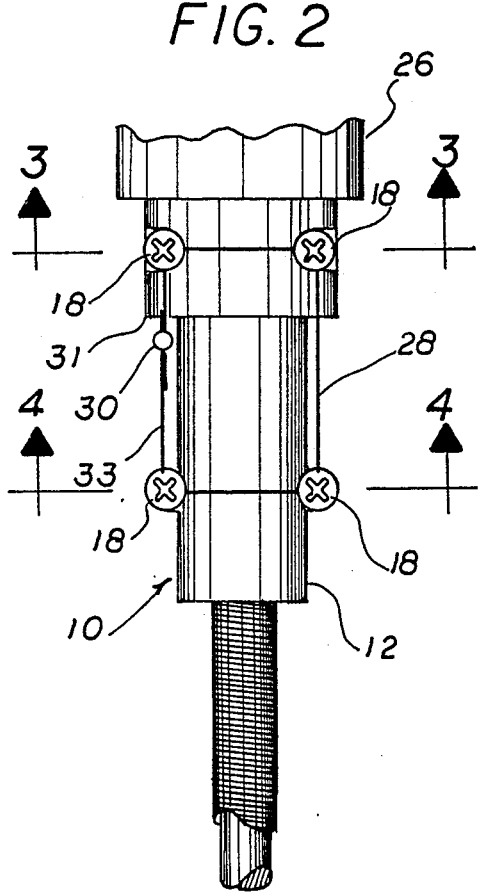
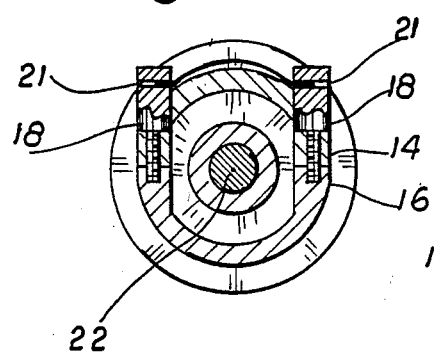
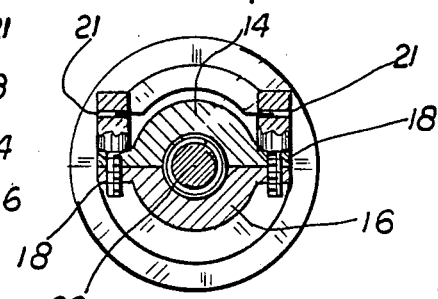
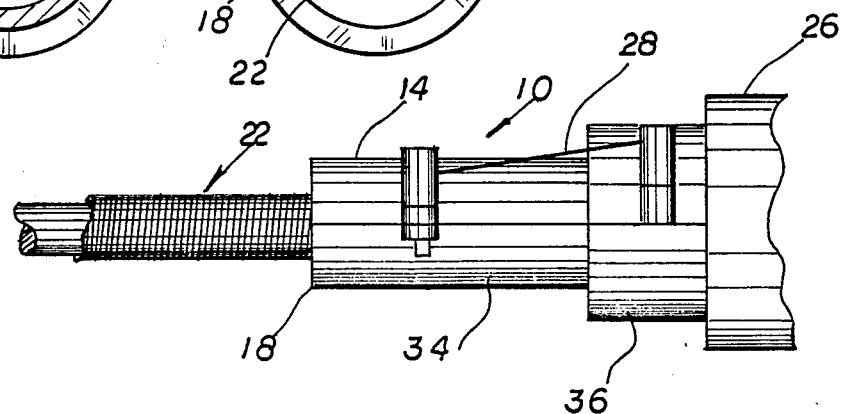

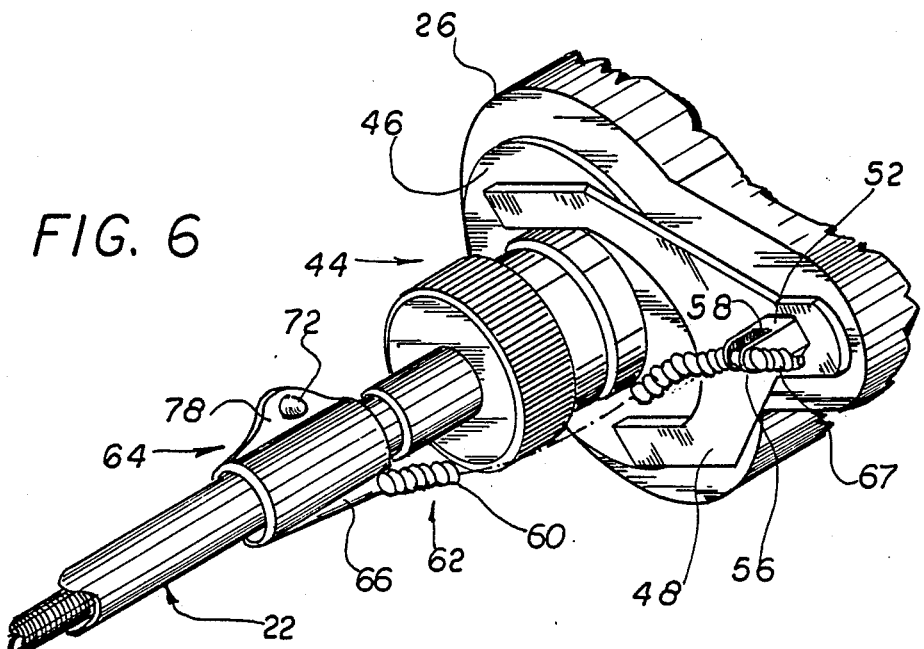
FIG. 6
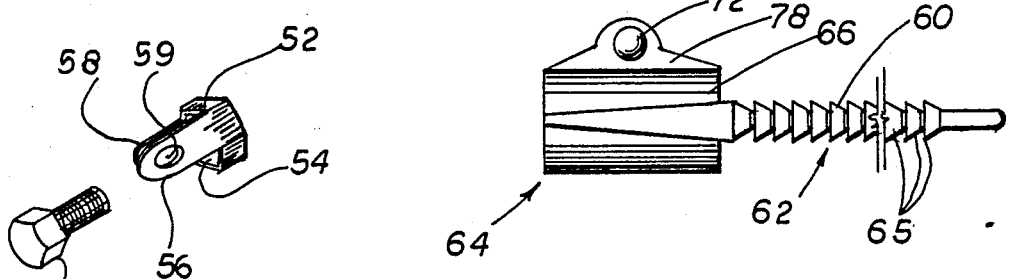
FIG. 7
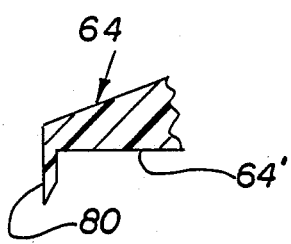
FIG. 8
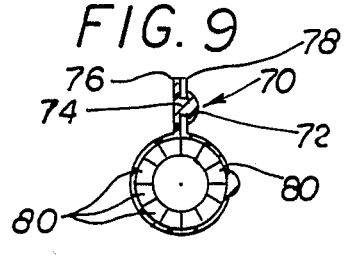
FIG. 9
FIG. 10
FIG. 11
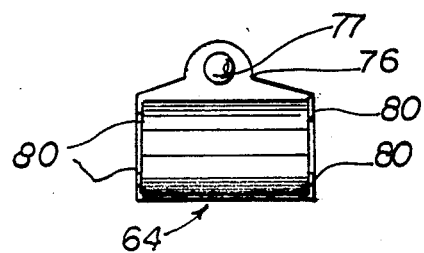

TAMPER PROOF ASSEMBLY

BACKGROUND OF THE INVENTION

1. Field of the Invention

This invention relates to an assembly to prevent or at least indicate unauthorized tampering or more specifically, disconnection of the odometer cable from the transmission system of an automobile or like vehicle for purposes of misrepresenting actual mileage on the engine of the vehicle.

2. Description of the Prior Art

An instrument found virtually in all automobiles, trucks or like vehicles is the odometer indicating the amount of mileage traveled by the vehicle. The mileage indicates generally the length of time of operation of the various component parts of the automobile, particularly the engine. With those interested in misrepresenting the extent of use of an automobile, it is fairly common practice to attempt to disconnect the odometer cable from the transmission system of the automobile. Once disconnected, the vehicle can then travel literally thousands of miles without such "mileage" being registered on the odometer. While in many states such tampering is illegal since the indicated mileage is a general representation as to the amount of use to which the automobile has been subjected, such tampering through disconnection of the cable, is in fact still done by the unscrupulous.

Based on the above set forth problem, numerous attempts have been made in the prior art to discourage or prevent such disconnection or otherwise tampering, or at least provide some clear indication as to when such tampering has taken place. For example, the following U.S. patents are generally representative of devices existing in the prior art which attempt to provide a tamper proof odometer or alternately, provide some indication as to when tampering has occurred. The patent to Bergsma et al., U.S. Pat. No. 3,539,783, discloses a tamper proving odometer construction in which the peripheral surface of at least the highest odometer wheel is indelibly marked or stained by a marking instrumentality as the wheel is advanced past the viewing window. Therefore a "resetting" of the odometer is prevented or at least clearly indicated.

Hachtel, U.S. Pat. No. 3,667,671, discloses an antireverse odometer one-way drive which prevents positioning or resetting of the odometer by positioning of the various wheels thereof in a reverse direction.

The U.S. patents to Reagan, U.S. Pat. Nos. 3,785,551, and 4,267,438, both are directed to tamper proof odometer having digit wheels mounted for rotation about a shaft. The structural features of the odometer in one patent (551) discloses the odometer wheels being driven on gears mounted on gear carrier plates with the plates separating adjacent wheels. The shaft is non-circular permitting rotation of the wheels but not the carrier plates. In the other of the above-noted patents (438), the shaft is grooved and the end caps are fixedly attached to the shaft end so that the shaft will break if any attempt is made to remove the caps by drilling, sawing, etc.

Woodward, U.S. Pat. No. 4,284,882, discloses a tamper resistible odometer including a construction wherein manually attempt to reverse the number settings thereon by separating the pinion gear engagement with numbered wheel gears results in a fractured pinion gear and permanently disengages the pinion gears from the numbered wheel gears.

All of the above-noted structures disclosed in the aforementioned patents are directed to structural components which prevent or make quite apparent the actual manipulation of the number wheels. However, it is well known to prevent mileage from being registered onto an automobile to disconnect the odometer cable from its driving engagement through any type of mounting adaptor directly to the transmission.

Therefore, there is a recognized need in the industry for some type of protective device preferably used in association with a tamper indicator such that any attempted disconnection or exposure, even when authorized, of the connection between the odometer cable and the transmission will be clearly indicated. Any potential buyer will thereby be able to ensure that the mileage on a given vehicle is accurate, at least to the extent that the odometer cable has not been previously disconnected without being apparent.

SUMMARY OF THE INVENTION

The present invention relates to a tamper indicating and/or protection assembly designed to be used for the protective covering of the odometer cable at the location where it is conventionally connected to the transmission of an automobile, truck or like motor vehicle. It is, of course, well known that in order to register mileage a given vehicle has traveled, the odometer cable is drivingly connected to a special mounting adaptor secured to the transmission of an automobile. Continuous driving and operation of the transmission will therefore cause a registry of miles traveled, thereby providing a clear indication as to the amount of use a given vehicle has encountered. In order to prevent any tampering or disconnection of the odometer cable, which would have the effect of allowing use of the vehicle without registering the miles traveled, the subject invention includes a tamper indicator and protection assembly associated with the prevention of disconnection of the odometer cable from the transmission.

In one embodiment of the present invention, to be described in greater detail hereinafter, an elongated substantially rigid material sleeve is comprised of two sleeve segments which are removably secured to one another and attached in surrounding, encasing and accordingly, protecting relation to the odometer cable and to the junction of the odometer cable to the transmission. Inter-connection of the sleeve segments in the aforementioned protective, operative position is accomplished by a connector means defined by a plurality of connectors. The connectors are attached to the sleeve segments so as to cause their inter-connection to one another and the connectors are disposed at a predetermined spaced apart location. A tamper indicator includes an elongated configuration and is preferably defined by an elongated, flexible material cable which extends between and is attached to each of the plurality of connectors defining the connector means. The attachment between the tamper indicator cable and each of the connectors is such that any attempted removal or displacement of any one of the connectors from its inter-connecting engagement with the sleeve segments causes a force to be applied to the tamper indicator cable causing it to be severed along its length. Alternately, free ends of the tamper indicator are attached to one another by a seal member. Any forcing of the seal member in order to separate the cable and disconnect it from any one or all of the connector elements will result in a "breaking" of the seal member and a clear indication that attempts have been made to tamper with the sleeve and that the odometer cable may have been disconnected.

Another embodiment of the present invention is directed toward a mounting sleeve being removably secured to the cable in spaced relation to its inter-connection with the transmission. However, the mounting sleeve is attached to one end of an elongated tamper indicator formed at least in part from a frangible or severable material. The opposite or distal end of the tamper indicator is attached to a mounting bracket for a connector which serves to removably secure a mounting adaptor onto the housing of the transmission. This mounting adaptor is necessary for the securement of the inter-connection between the odometer cable and the transmission. Accordingly, any attempted disconnection of the odometer cable from the transmission, whether authorized or unauthorized, necessitates the removal of the mounting adaptor. This in turn is prevented since the aforementioned distal end of the tamper indicator is secured to a receptor and is more specifically, disposed in overlying, blocking engagement to any removal or displacement of the connector which serves to attach the mounting adaptor to the housing of the transmission.

The tamper indicator in this embodiment comprises an elongated configuration formed of a flexible material and more specifically, of a plurality of inter-connected segments. Each of the segments are secured to one another at a weakened junction. Undue force supplied to any portion of the length of the tamper indicator will cause its severing at the affected junction. Such severing or breaking of the continuous length of the tamper indicator will be indicative that attempts have been made either to remove the mounting sleeve and/or remove or separate the distal end of the tamper indicator from the receptor for attempted exposure of the inter-connection between the odometer cable and the transmission.

BRIEF DESCRIPTION OF THE DRAWINGS

For a fuller understanding of the nature of the present invention, reference should be had to the following detailed descriptions taken in connection with the accompanying drawings in which:

FIG. 1 is a longitudinal sectional view in partial cut-away of one embodiment of the assembly of the present invention.

FIG. 2 is a longitudinal front view in partial cut-away of the embodiment of FIG. 1.

FIG. 3 is a transverse sectional view along line 3—3 of FIG. 2.

FIG. 4 is a transverse sectional view along line 4—4 of FIG. 2.

FIG. 5 is a longitudinal side view in partial cut-away of the embodiment of FIG. 1.

FIG. 6 is a perspective view in partial cut-away of another embodiment of the present invention.

FIG. 7 is a detailed view of a mounting sleeve of the embodiment of FIG. 6 in partial cut-away.

FIG. 8 is a detailed view in exploded form of one component of the embodiment of FIG. 6.

FIG. 9 is an end view of the mounting sleeve of FIG. 7.

FIG. 10 is a detailed sectional view along line 10—10 of FIG. 7.

FIG. 11 is an interior longitudinal sectional view of the mounting sleeve of the embodiment of FIG. 7.

Like reference numerals refer to like parts throughout the several views of the drawings.

DETAILED DESCRIPTION OF THE PREFERRED EMBODIMENT

The present invention is represented in two embodiments wherein a first preferred embodiment is shown in FIGS. 1 through 5. More specifically, the tamper proof protection assembly is generally indicated as 10 and comprises a sleeve 12 defined by two sleeve segments 14 and 16. Collectively, the sleeve segments 14 and 16 are secured to one another by connector means. The connector means includes a plurality of connectors 18 designed to be threadably received within internally threaded sockets or apertures 20. Further, the connectors are disposed in spaced apart relation to one another and serve to inter-connect, through the aforementioned threaded engagement, the two sleeve segments 14 and 16, as clearly shown in FIGS. 2, 3 and 4.

Also as clearly shown, an odometer cable as at 22 has one end thereof as at 24 drivingly connected in conventional fashion to a transmission assembly of an automobile, truck or like motor vehicle. Accordingly, driving inter-connection between the transmission 26 and the odometer cable 22 serves to register the actual miles traveled by the vehicle on an odometer (not shown for purposes of clarity). It is generally well known that disconnection of the odometer cable 22, particularly at the end 24, from its driving inter-connection with the transmission 26 will eliminate any actual registry of the miles traveled on the odometer of the vehicle. In order to prevent such unauthorized disconnection or indicate if a disconnection has in fact occurred, the protective sleeve 10 has a associated therewith a tamper indicator 28. In this embodiment of the present invention, the tamper indicator 28 is in the form of an elongated, flexible material cable which is frangible at least to the extent that it may be severed along its length when excess force is applied thereto, such as when any one or all of the connectors 18 are removed from its respective attached positions serving to inter-connect the sleeve segments 14 and 16.

The cable 28 is connected to each of the connectors 18 in a closed, continuous configuration through the provision of a seal means 30 attaching free ends as at 31 and 33 of the cable 28. The seal means 30 is also frangible in that attempted separation of the free ends 31 and 33 from their secured position relative to one another will cause a "breaking" of the seal means 30 which will provide further indication that attempted exposure and possible disconnection of the odometer cable 22 from the transmission 26 has occurred. Further structural features of the mounting sleeve 10 include each sleeve segment including an elongated shank portion as at 34 integrally formed to an upper head portion as at 36. An interior chamber 38 is formed within the head 36. The chamber is specifically adapted to include a receiving, substantially annular socket 40 serving to engage an outwardly projected, substantially annularly shaped flange 42 on what may be considered a mounting adaptor 44 associated with the inter-connection between the corresponding end 24 of the odometer cable 22 and the transmission 26. Gripping or securement of the flange 42 by the annular socket 40 in the manner shown will prevent longitudinal movement or displacement of the sleeve 12 from its intended, operative position as shown in FIG. 1.

Again with reference to the connectors 18, each includes an aperture extending therethrough as at 21. Each of these apertures or channels 21 is dimensioned and configured to allow passage and receipt of a portion of the cable 28 of the tamper indicator to pass therethrough. Passage of a portion of the cable 28 in the manner shown will prevent even minimal displacement of any of the connectors 18 from its inter-connecting position between the sleeve segments 14 and 16. Any forced pressure exerted on any of the connectors 18 or the cable itself 28 will serve to sever the tamper indicator cable 28 and or the seal means 30. This provides clear indication that tampering has possibly occurred with relation to the disconnection of the odometer cable 22 from the transmission 26.

Yet another embodiment of the present invention is represented in FIGS. 6 through 11. In such embodiment, as clearly shown in FIG. 6, the transmission 26 is drivingly inter-connected to the odometer cable 22. In order to accomplish this driving inter-connection, a connection assembly, generally indicated at 44, comprises a coupling housing including a coupling flange 46 connected to the housing of the transmission 26 by a mounting adaptor 48. The mounting adaptor 48 is secured by a connector element 50 which passes through a mounting bracket 52 into threaded engagement with a portion of the housing of the transmission 26 as clearly shown in FIGS. 7 and 8. However, the connector 50 passes into the interior as at 54 of the bracket 52. Two outwardly extending, spaced apart and preferably parallel ears 56 and 58 define a receptor for the receipt of a distal end of an elongated cable 60 defining a tamper guide generally indicated as 62.

The opposite end of the cable 60 of the tamper indicator 62 is integrally or otherwise securely attached to a mounting sleeve generally indicated as 64. The proximal end 66 of the cable 60 may be molded to the outside of the mounting sleeve 64 for firm attachment thereto. The mounting sleeve 64, as clearly shown in FIG. 6, is secured by a connector means 70 generally indicated as 40 such in FIG. 9. Such connector means includes an enlarged head 72 integrally secured to a finger 74. The finger is integrally secured to a confronting surface of one flange 76 on a longitudinal opening or slot in the mounting sleeve 64. The opposite confronting flange as at 78 has an opening formed therein. The material from which the enlarged head 72 is formed, as well as the overall configuration thereof, facilitates passage of the head into the opening in the flange 78. However, forced removal or separation of the flanges will cause a separation or severing of the head from the finger 74 due to the frangible material from which it is formed. Accordingly, any forcing of the mounting sleeve 64 from its operative position in surrounding relation to the odometer cable 22 will be indicated. Therefore, it should be readily apparent that access to the connection between the odometer cable 22 and the transmission 26 necessitates the removal of the coupling 44. In turn, the connector 50 must be unthreaded or otherwise removed from the bracket 52. Due to the outward extension of the ears 56 and 58 and more particularly, to the existence of a receiving aperture within the thereby defined receptor as at 59, the removal of the connector 50 is prevented. Such removal is prevented due to the placement of the distal end 67 of the cable 60 defining the tamper indicator 62 in overlying and blocking relation to any displacement of the connector 50. Further, the cable 62 is formed from a plurality of segments 65 (see FIG. 7). These segments 65 are inter-connected at junctions, themselves formed from a frangible or weakened material which may define the frangible portion of the cable 60. Any undue force such as that tending to separate the sleeve 66 from the cable or the distal end 67 from the receptor defined by the ears 56 and 58 will cause a severing or separation of a portion of the length of the cable 60. This provides a clear indication that tampering has been attempted. As set forth above, unauthorized removal of the mounting sleeve 64 from its surrounding position relative to the odometer cable 22 is prevented due to the frangible material from which the finger 74 is formed and the separation of the enlarged head 72 once the confronting flanges 76 and 78 are attempted to be separated by any undue separating force.

Other features associated with the present invention include the provision of a plurality of radially inwardly extending, flexible material teeth 80 extending inwardly from an inner surface 64' of the sleeve 64 into engaging relation with the outer surface of the odometer channel 22. This is provided in order to adapt the mounting sleeve 64 to any one of a variety of different sizes of odometer cables 22 and to ensure a snug fit therebetween. Such snug fit will prevent inadvertent longitudinal displacement of the mounting sleeve 64 along the length of the cable and an inadvertent breaking or severing of the tamper indicator 62 or any portion of the plurality of segments 65 defining the length of the cable 60.

Now that the invention has been described, what is claimed is:

1. A tamper proof protection assembly to prevent unauthorized removal of an odometer cable from a transmission of an automobile or like vehicle, said assembly comprising:
   (a) a mounting sleeve attached in surrounding engagement with the odometer cable,
   (b) a connector means secured to said mounting sleeve and structured for attachment of said mounting sleeve in an operative position,
   (c) a tamper indicator having an elongated configuration with a proximal end attached to said sleeve and an oppositely disposed distal end secured to a mounting structure disposed to normally secure a mounting adaptor securing the cable to the transmission,
   (d) attachment means inter-connecting the mounting structure to the transmission, said attachment means structurally adapted to secure said tamper indicator thereto in a blocking disposition relative to removal of said attachment means and mounting structure from the transmission, and
   (e) said tamper indicator formed at least in part from a frangible material and disposed and structured to be severed upon removal of said attachment means.

2. An assembly as in claim 1 wherein said connecting means is formed, at least in part, from a frangible portion and is disposed between an open position and a locked position, said locked position defined by closure of said mounting sleeve about and in surrounding relation to the cable and said frangible portion disposed and structured for separation from a remainder of said connecting means upon a forced displacement of said connecting means from said locked position to said open position.

3. An assembly as in claim 2 wherein said connecting means comprises two connecting flanges formed on a mating, open end of said mounting sleeve and an outwardly projecting finger having an enlarged head formed on one flange and a receiving opening formed on the other of said flanges, said head disposed and configured to facilitate passage thereof through said opening and being formed of a frangible material sufficient to be severed upon forced removal thereof from said opening upon forced displacement of said connecting means from said locked position to said open position.

4. An assembly as in claim 2 wherein said sleeve comprises a plurality of flexible material projections formed on an interior surface thereof and extending outwardly therefrom into engaging relation with external surface portions of the cable.

5. An assembly as in claim 4 wherein said disposition and flexibility of said projections are sufficient to ensure a tight fit of said mounting sleeve about any one of a variety of cables of varying sizes.

6. An assembly as in claim 1 wherein said attachment means comprises an attachment bracket secured to the mounting adaptor and including a receiving aperture formed therein and a connector dimensioned to pass through said receiving aperture into connection with the mounting adaptor; said bracket including a receptor formed thereon and adapted to receive said tamper indicator in substantially overlying and blocking relation to said connector element when attached to said mounting bracket.

7. An assembly as in claim 6 wherein said receptor comprises a plurality of ears mounted on said bracket and extending outwardly from an exposed portion thereof in spaced relation to one another, said ears further structured and disposed to receive said tamper indicator therein in overlying, blocking relation to said connector.

8. An assembly as in claim 7 wherein said frangible portion is disposed to be severed upon removal of said connector from said brackets.

9. An assembly as in claim 1 wherein said tamper indicator comprises a plurality of integrally inter-connected segments extending along a major portion of the length thereof and each segment inter-connected to one another by a weakened material junction defining said frangible portion, said tamper indicator being severable between any of said segments upon excess force being applied thereto.

10. A tamper proof protection assembly to prevent unauthorized removal of an odometer cable from a transmission of an automobile or like vehicle, said assembly comprising:

(a) a mounting sleeve having an elongated configuration dimensioned and configured to be mounted in surrounding engagement with the odometer cable, (b) said sleeve including a head portion having a chamber formed on an interior thereof and secured to a mounting adaptor serving to attach the odometer cable to the transmission, (c) connector means attached to said sleeve for connecting said sleeve to the cable and to the mounting adaptor, (d) a tamper indicator having an elongated configuration and secured to said connector means, said tamper indicator formed at least in part from a frangible material structured to be severed upon detachment of said connector means from said sleeve, and (e) whereby severing of said tamper indicator is indicative of removal of said sleeve and exposure of the odometer for disconnection from said transmission.

11. An assembly as in claim 10 wherein said sleeve comprises two sleeve segments removably secured to one another by inter-connection of said connector means thereto, said sleeve segments collectively disposed in encasing relation to the odometer cable and the mounting adaptor.

12. An assembly as in claim 11 wherein said connector means comprises a plurality of connector elements mounted in spaced relation to one another and each disposed in inter-connecting engagement with said sleeve segments.

13. An assembly as in claim 12 wherein said tamper indicator is secured to each of said connector elements and extends continuously therebetween to define a continuous closed configuration, said tamper indicator being severable along a length thereof upon removal of any one of said connector elements from said sleeve segments.

14. An assembly as in claim 13 wherein each of said connector elements comprises an adaptor means formed thereon and dimensioned and configured for receipt and passage of said tamper indicator therethrough, said tamper indicator attached to each of said connector elements in blocking engagement to the displacement thereof from said sleeve segments.

15. An assembly as in claim 14 wherein said tamper indicator comprises an elongated cable formed of flexible, frangible material and secured to each of said connector elements at spaced apart locations along said length.

16. An assembly as in claim 15 wherein said tamper indicator further comprises a seal means attached to said cable in inter-connecting relation to correspondingly positioned free ends thereof, said seal means being severable upon detachment of said free ends from one another whereby severing of said seal means is indicative of removal of said tamper indicator and connector elements in attempted disconnection of said odometer cable.

* * * * *